US011204104B2

(12) United States Patent
Krause et al.

(10) Patent No.: US 11,204,104 B2
(45) Date of Patent: Dec. 21, 2021

(54) SYSTEMS AND METHODS FOR TORQUE ISOLATION VALVE ACTUATOR

(71) Applicant: TapcoEnpro, LLC, Channelview, TX (US)

(72) Inventors: Kenneth Krause, Sandy, UT (US); Benjamin Bailey, Channelview, TX (US)

(*) Notice: Subject to any disclaimer, the term of this patent is extended or adjusted under 35 U.S.C. 154(b) by 0 days.

(21) Appl. No.: 16/414,388

(22) Filed: May 16, 2019

(65) Prior Publication Data

US 2020/0362976 A1 Nov. 19, 2020

(51) Int. Cl.
*F16K 27/08* (2006.01)
*F16K 3/24* (2006.01)
*F16K 27/04* (2006.01)
*F16K 31/50* (2006.01)
*C10B 39/08* (2006.01)

(52) U.S. Cl.
CPC .............. *F16K 27/08* (2013.01); *F16K 3/243* (2013.01); *F16K 27/041* (2013.01); *F16K 27/048* (2013.01); *F16K 31/50* (2013.01); *F16K 31/508* (2013.01); *C10B 39/08* (2013.01); *Y10T 137/8275* (2015.04); *Y10T 137/8292* (2015.04)

(58) Field of Classification Search
CPC ...... F16K 31/50; F16K 31/508; F16K 27/041; F16K 27/048; F16K 27/08; F16K 3/243; Y10T 137/8275; Y10T 137/8292; C10B 39/08

USPC .............. 251/266, 267, 269, 270, 271, 273; 137/556, 556.3

See application file for complete search history.

(56) References Cited

U.S. PATENT DOCUMENTS

| | | | | |
|---|---|---|---|---|
| 2,146,470 | A * | 2/1939 | Grantham | E21B 33/062 251/1.3 |
| 4,235,258 | A * | 11/1980 | Uno | F16K 37/0008 137/556 |
| 5,271,602 | A * | 12/1993 | Funaba | B01J 3/03 251/326 |
| 6,918,574 | B2 * | 7/2005 | Hallden | F16K 3/0254 251/267 |
| 8,851,451 | B2 * | 10/2014 | Orino | F16K 31/05 251/267 |
| 9,010,728 | B2 * | 4/2015 | Schubert | F16K 3/12 251/326 |
| 9,388,342 | B2 * | 7/2016 | Orino | C10B 43/06 |
| 10,436,347 | B2 * | 10/2019 | Dubus | F16K 31/504 |
| 2012/0153198 | A1 * | 6/2012 | Biester | F16K 31/048 251/129.12 |

* cited by examiner

*Primary Examiner* — Matthew W Jellett
(74) *Attorney, Agent, or Firm* — Michael F. Krieger; Kirton McConkie

(57) ABSTRACT

A low-volume non-rising stem gate valve comprising a hollow stem, planetary roller screw and anti-rotation rods. The anti-rotation rods isolate the torque force and maintain the alignment of the planetary roller screw with the stem and the screw shaft, thus reducing the amount of material necessary to support ordinary operational forces.

20 Claims, 8 Drawing Sheets

SYSTEMS AND METHODS FOR TORQUE ISOLATION VALVE ACTUATOR

TECHNICAL FIELD

The present disclosure relates generally to a torque isolation valve actuator. More particularly, the disclosure relates to systems and methods for isolating the torque force from acting on the stem to reduce the size of the actuator housing.

BACKGROUND

Electric actuators mount on valves which, in response to a signal, move the valve to a desired position using an outside power source. Various electric types of motors use AC or DC electricity to drive a combination of gears to generate the desired torque level. There are various types of electric actuators used in different industries depending on a desired application. Each type of actuator may be used with a specialized valve of choice. For example, rotary electric actuators are typically used in combination with a ball, plug, and butterfly valves. Linear electric actuators are often used with a gate, globe, diaphragm, pinch, and angle valves that feature a sliding stem that opens or closes the valve. Electric actuators often provide control and indexing capabilities to allow multiple position stops along strokes.

In the hydrocarbon processing industry, many refineries recover valuable products from the heavy residual oil that remains after refining operations are completed. This recovery process is known as delayed coking and produces valuable distillates and coke in large vessels or coke drums.

When a coke drum is full it must be emptied of the byproduct it holds in preparation for refilling the coke drum in another cycle. First, the coke drum is steam purged and cooled with quench water. The coke drum is then drained of water and vented to atmospheric pressure, after which the top and bottom flanges are removed, a process referred to as de-heading. Once the coke drum is de-headed, the coke remaining within the coke drum is removed and emptied into a catch basin. Once the coke is removed, the heads are replaced and the coke drum is prepared to repeat the cycle.

In addition to the dangers inherit in the unheading of a coke drum during the decoking process, space on the working deck around the deheader valve is limited. Various prior art devices have been utilized as deheader valves. Electric actuator systems, pneumatic actuator systems and hydraulic actuator systems have all been utilized in prior art deheader valve systems. In typical electric actuator systems, the drive stem extends beyond the electric actuator when the blind is in an open position, such that use of an electric actuator requires an additional several feet of deck space during operation. Additionally, prior art electric actuators allow tortional loads to reach the valve stem, resulting in increased wear on system elements within the valve itself. Wear within the valve necessitates expensive downtime and repair. The large amount of floor space required to accommodate these assemblies and devices that automate removal of the flange head from the coke drum is extremely undesirable and downtime of the valve is profoundly expensive for a decoker operation.

Additionally prior art electric actuators have unpredictable life spans. The pressure, load and velocity at which electric actuators most move a gate through the open and closed positions affect where on the actuator system wear will occur. Side loading, the cut of threads, dirt and other debris additionally affect prior art devices and can accelerate wear and decrease the life of the actuator. Additionally, prior art devices have failed to produce electric actuators which produce constant thrust output for a constant torque input. Accordingly, prior art actuators produce inconsistent thrust output over the lifespan of the electric actuator producing inconsistent and undesirable results. Further prior art systems utilizing electric actuators often fail to open and close quickly enough to mitigate dangerous conditions inherent in unheading a coke drum during a de-coking process. Such prior art devices are not capable of operating within the size constraints imposed by the environment at the bottom of a coke drum, are incapable of producing consistent thrust output over the lifespan of the actuator and do not allow for predictive maintenance and can produce unsafe conditions. Moreover, maintaining alignment of actuator parts is critical to proper long-term operation of the valve.

SUMMARY

The general purpose of the systems and methods disclosed herein is to provide an improved torque isolating valve actuator. Specifically, isolating the torque force so as to not exert the torque force on the stem so as the stem can be sized without accounting for the torque force. The overall apparatus contains an actuator housing; a nut housing disposed within the actuator having an actuator end and a stem end with a guide channels positioned on the outside of the nut housing; rollers within the nut housing; a screw shaft aligned axially through the rollers in the nut housing wherein the nut housing is configured to move along the screw shaft; anti-rotation rods disposed within the actuator housing and connected to the actuator housing and positioned outside the nut housing and passing through the guide channels wherein the guide channels and anti-rotation rods are configured to prevent the nut housing from rotating as the actuator rotates; and a non-rising hollow stem coupled to the stem end of the nut housing configured to pass the screw shaft as the nut housing moves along the screw shaft and wherein the nut housing and anti-rotation rods are configured to shield the stem from the transfer of a torque force caused by the rotation of the planetary roller screw. This apparatus is designed to work in conjunction with a variety of existing valves; however, the torque isolating valve is particularly helpful when the stem sizing limitations prohibit utilizing a stem sized to resist the torque force created by the actuator operation, as well as reduce misalignment of actuator parts due to torsional forces resulting from actuator operation.

Reference throughout this specification to features, advantages, or similar language does not imply that all of the features and advantages that may be realized with all embodiments or are in any single embodiment of the invention. Rather, language referring to the features and advantages is understood to mean that a specific feature, advantage, or characteristic described in connection with an embodiment is included in at least one embodiment of the invention disclosed. Thus, discussion of the features and advantages, and similar language, throughout this specification may, but do not necessarily, refer to the same embodiment, but may refer to every embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The features and advantages of the disclosed invention will become more fully apparent from the following description and appended claims, or may be learned by the practice of the invention as set forth hereinafter.

BRIEF DESCRIPTION OF THE DRAWINGS

In order to describe the manner in which the advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
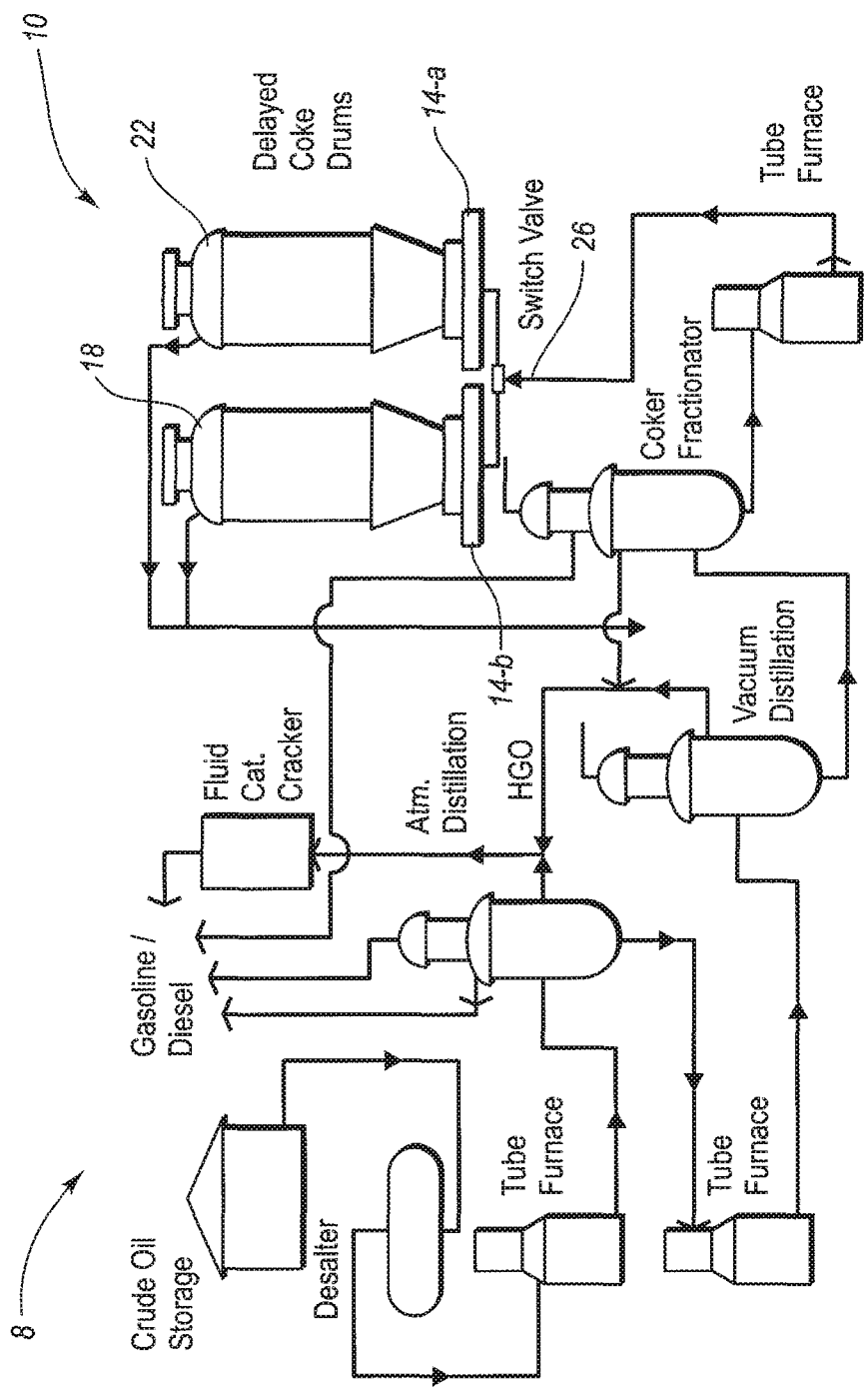
FIG. 1 shows generally, an exemplary refinery process, wherein refinery byproducts are routed to a series of coke drums for the manufacture of coke, and wherein the coke drums are equipped with the de-header valves.

Embodiments of the disclosed invention will be best understood by reference to the drawings, wherein like parts are designated by like numerals throughout. It will be readily understood that the components of the disclosed invention, as generally described and illustrated in the figures herein, could be arranged and designed in a wide variety of different configurations. Thus, the following more detailed descriptions of the embodiments of the apparatus, as represented in FIGS. 1, 2 3, 4A and 4B are not intended to limit the scope of the invention, as claimed, but are merely representative of present embodiments of the invention.

In general, the figures disclose an invention that provides a systems and methods for torque isolation valve actuator which isolate a torque forces from being exerted on a stem. The torque isolation system is especially beneficial for applications where the space is to limited to accommodate a large stem necessary to withstand torque forces inherent in the applications.

In the following description, numerous references will be made to coke processing, coke drums and related structures and processes, but these items are not shown in detail in the figures. However, it should be understood that one of ordinary skill in the art and in possession of this disclosure, would readily understand how the disclosed invention and existing actuators can be incorporated.

General Discussion on the Delayed Coking Process and the De-Heading of Coke Drums In the typical delayed coking process, petroleum residues are fed to one or more coke drums where they are thermally cracked into light products and a solid residue—petroleum coke. Several different physical structures of petroleum coke may be produced. To produce the coke, a delayed coker feed originates from the crude oil supplied to the refinery and travels through a series of process members and finally empties into one of the coke drums used to manufacture coke. A basic refinery flow diagram is presented as FIG. 1, with two coke drums shown.

Due to the shape of the coke drum, coke accumulates in the area near and attaches to the flanges or other members used to close off the opening of the coke drum during the manufacturing process. To empty the drum, the flanges or members must first be removed or relocated. In the case of a flanged system, once full, the coke drum is vented to atmospheric pressure and the top flange is unbolted and removed to enable placement of a hydraulic coke cutting apparatus. Removing or opening the bottom flange, or valve is commonly known as "de-heading" because it removes or breaks free the head of coke that accumulates at the surface of the flange or valve. Once the flanges are removed, the coke is removed from the drum by drilling a pilot hole from top to bottom of the coke bed using high pressure water jets. Following this, the main body of coke left in the coke drum is cut into fragments which fall out the bottom and into a collection bin, such as a bin on a rail cart, etc. The coke is then dewatered, crushed and sent to coke storage or a loading facility.

Embodiments of a Coke Drum De-Heading Systems

Although the present disclosure may be utilized in association with both top and bottom de-heading systems, or rather the de-heading system independent valve actuator system of the disclosed invention may be applicable and utilized on both the top and bottom openings of a coke drum, the following detailed description and preferred embodiments will be discussed in reference to a bottom de-heading system only. One ordinarily skilled in the art will recognize that the invention as explained and described herein for a coke drum bottom de-heading system may also be designed and used as a coke drum top de-heading system.

The present disclosure describes a valve system and method for unheading or de-heading a coke drum following the manufacture of coke therein. As the disclosed invention is especially adapted to be used in the coking process, the following discussion will relate specifically in this manufacturing area. It is foreseeable however, that the disclosed invention may be adapted to be an integral part of other manufacturing processes producing various elements or by products other than coke, and such processes should thus be considered within the scope of this application. For example, it is contemplated that the disclosed invention de-header system and de-header valves may be utilized within other critical service applications, such as inlet feed line isolation, blowdown isolation, fractionator isolation, and back warming.

FIG. 1 depicts, generally, a petroleum manufacturing and refinery process 8 having several elements and systems present (identified, but not discussed). In addition to these elements, petroleum manufacturing and refinery process 8 further comprises at least one coke drum and may include, as illustrated, a first and a second coke drum 18 and 22, respectively, and de-header valves 14-a and 14-b attached thereto. In typical delayed coking operations, there are at least two coke drums in simultaneous operation so as to permit the ongoing, batch continuous, manufacture and refinery of petroleum as well as its coke byproduct.

Figure 2:
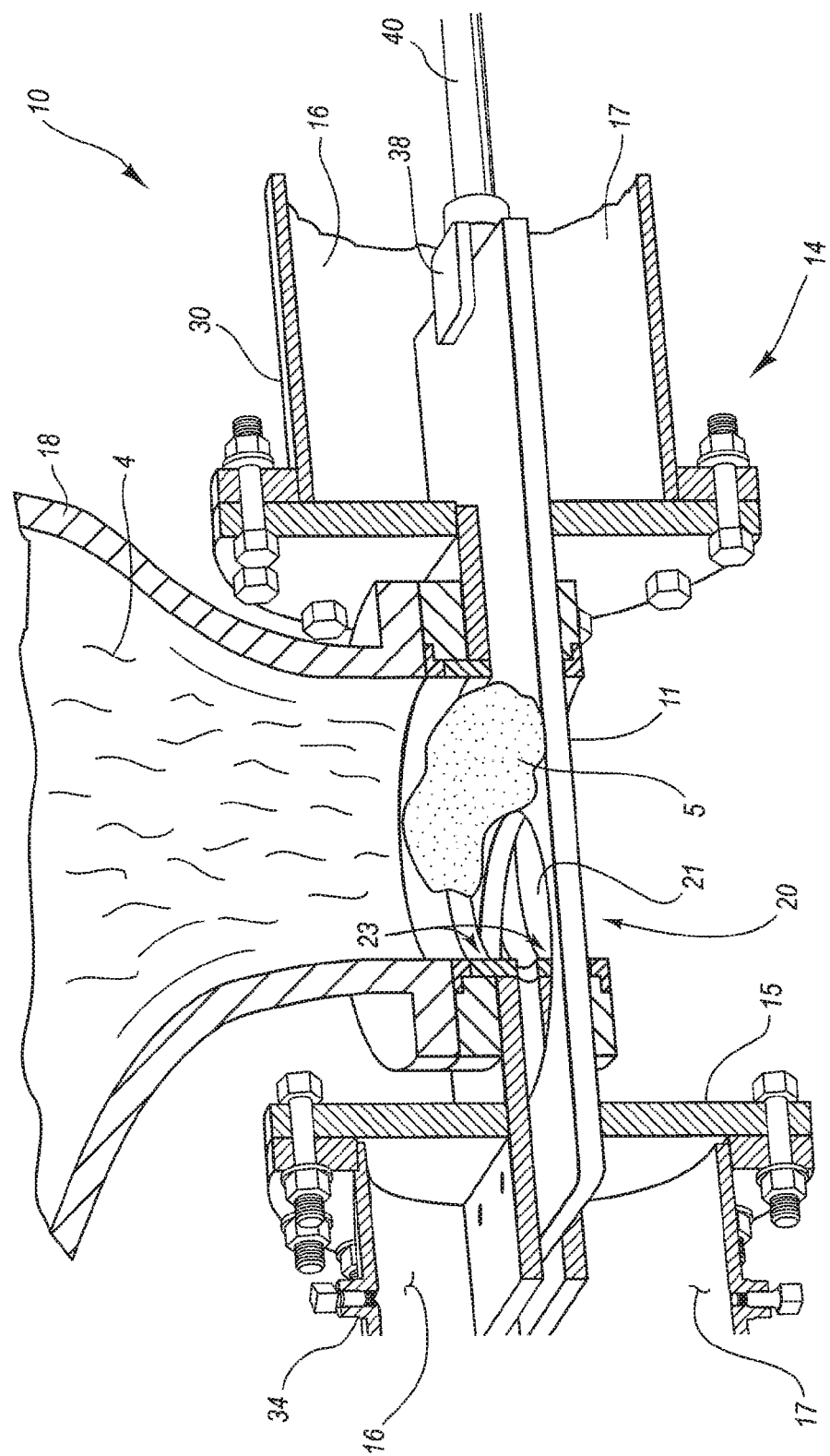
FIG. 2 illustrates a de-header valve coupled to a coke drum.
Figure 3:
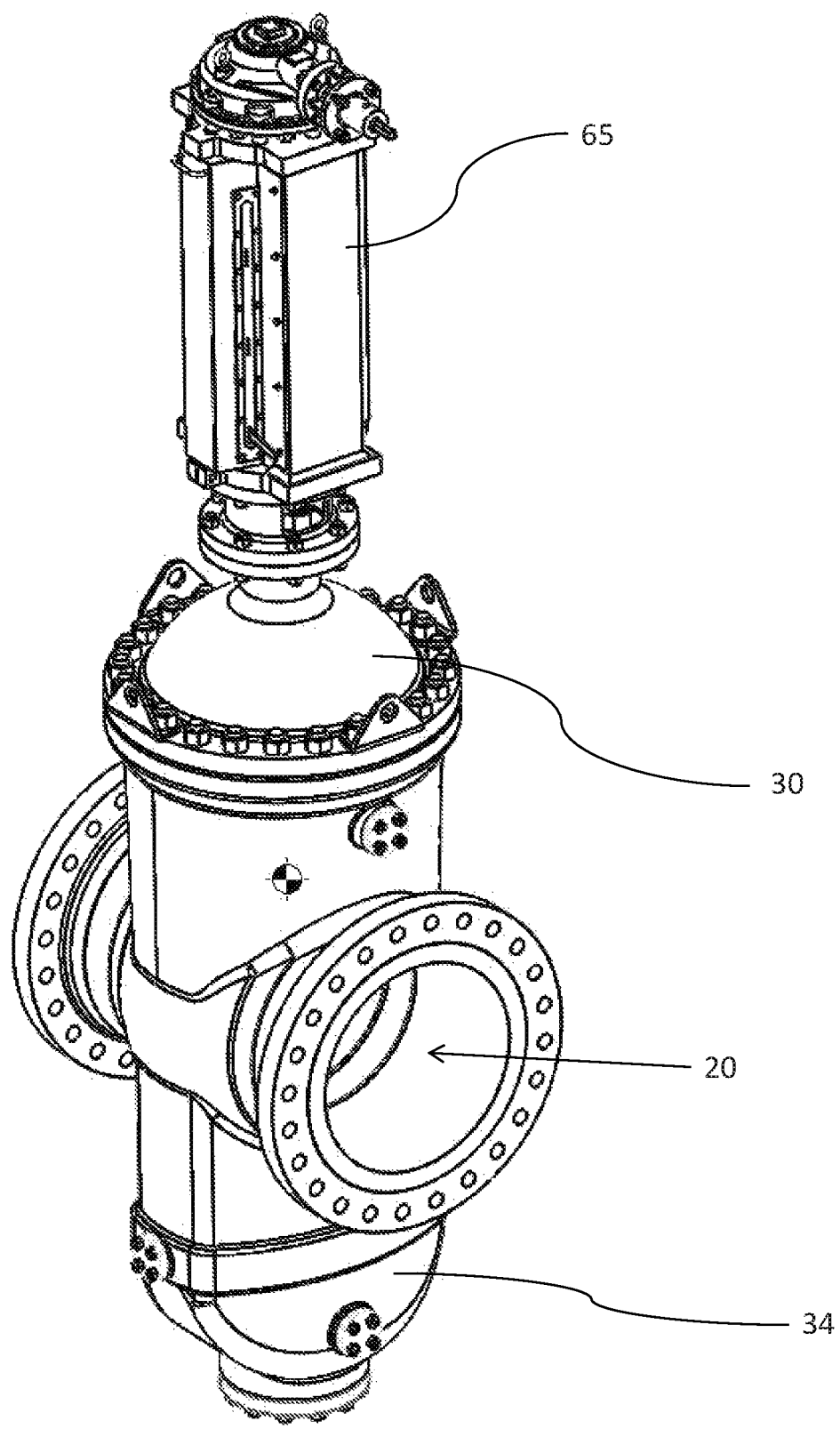
FIG. 3 illustrates a non-limiting embodiment of a deheader valve system comprising a valve, a gate, a transmission system and a gear box.
Figure 4:
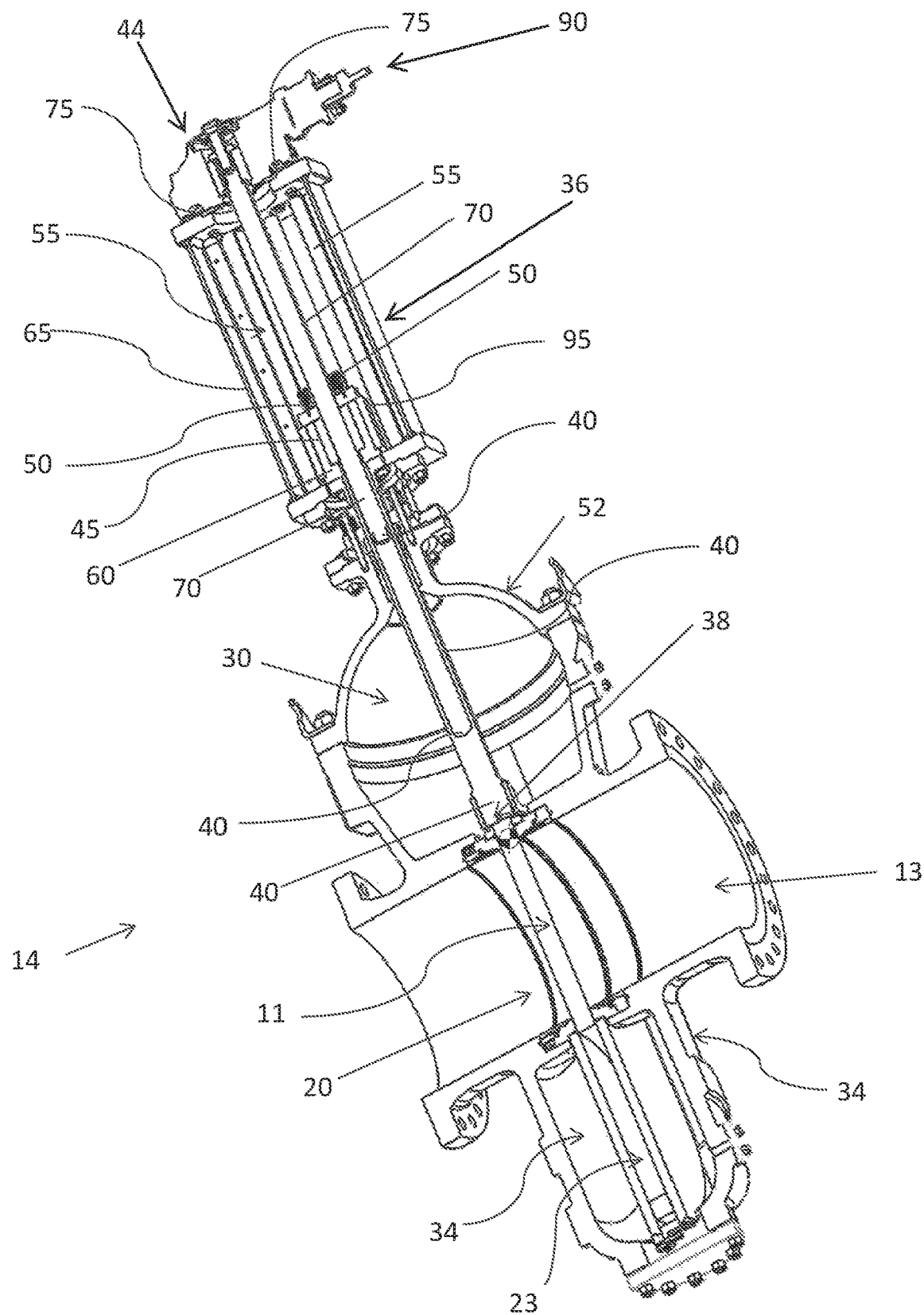
FIG. 4 illustrates a non-limiting cross-sectional view of an embodiment of a deheader valve.
Figure 5:
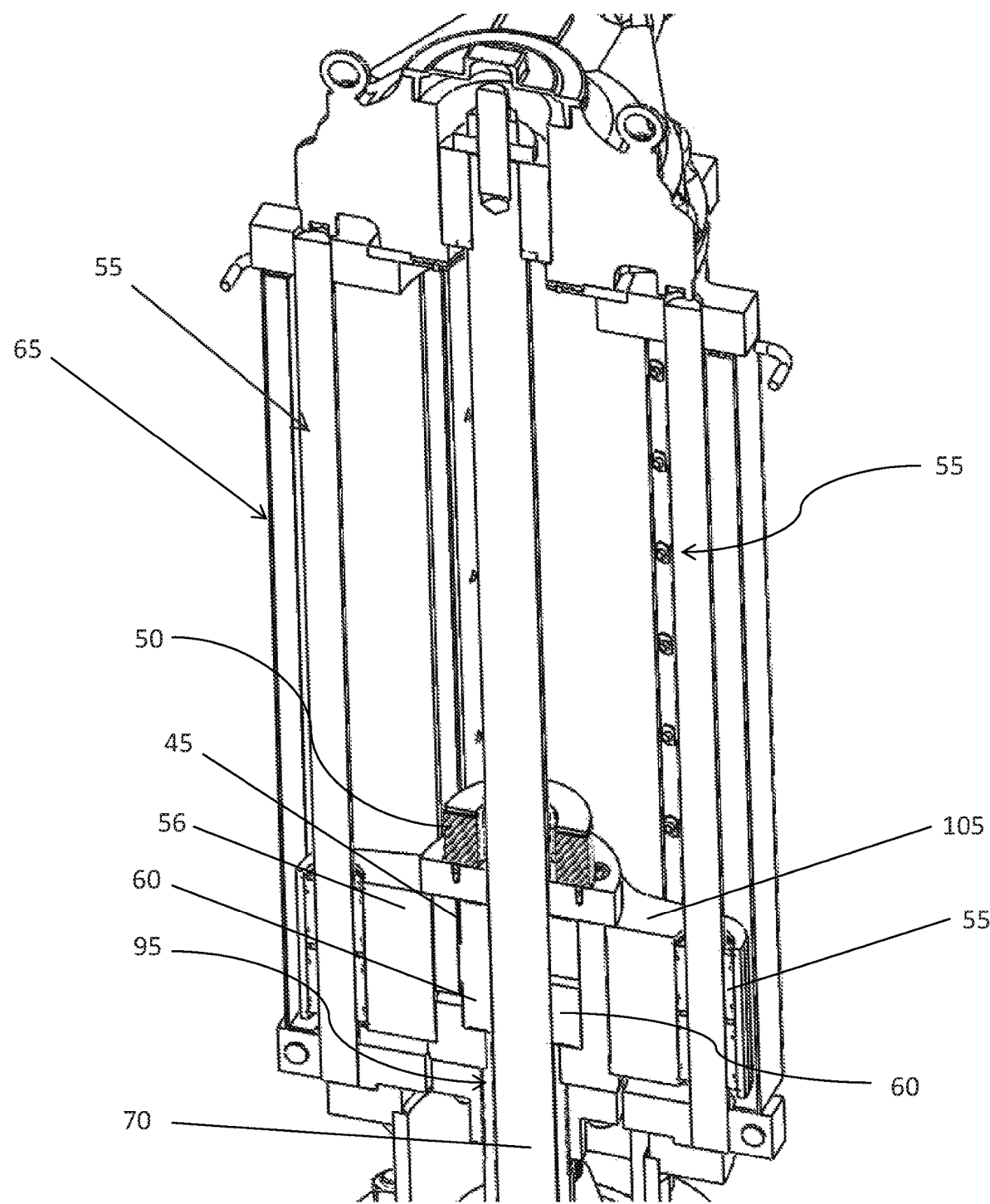
FIG. 5 illustrates a non-limiting cross-sectional view of an embodiment of the actuator housing.
Figure 6:
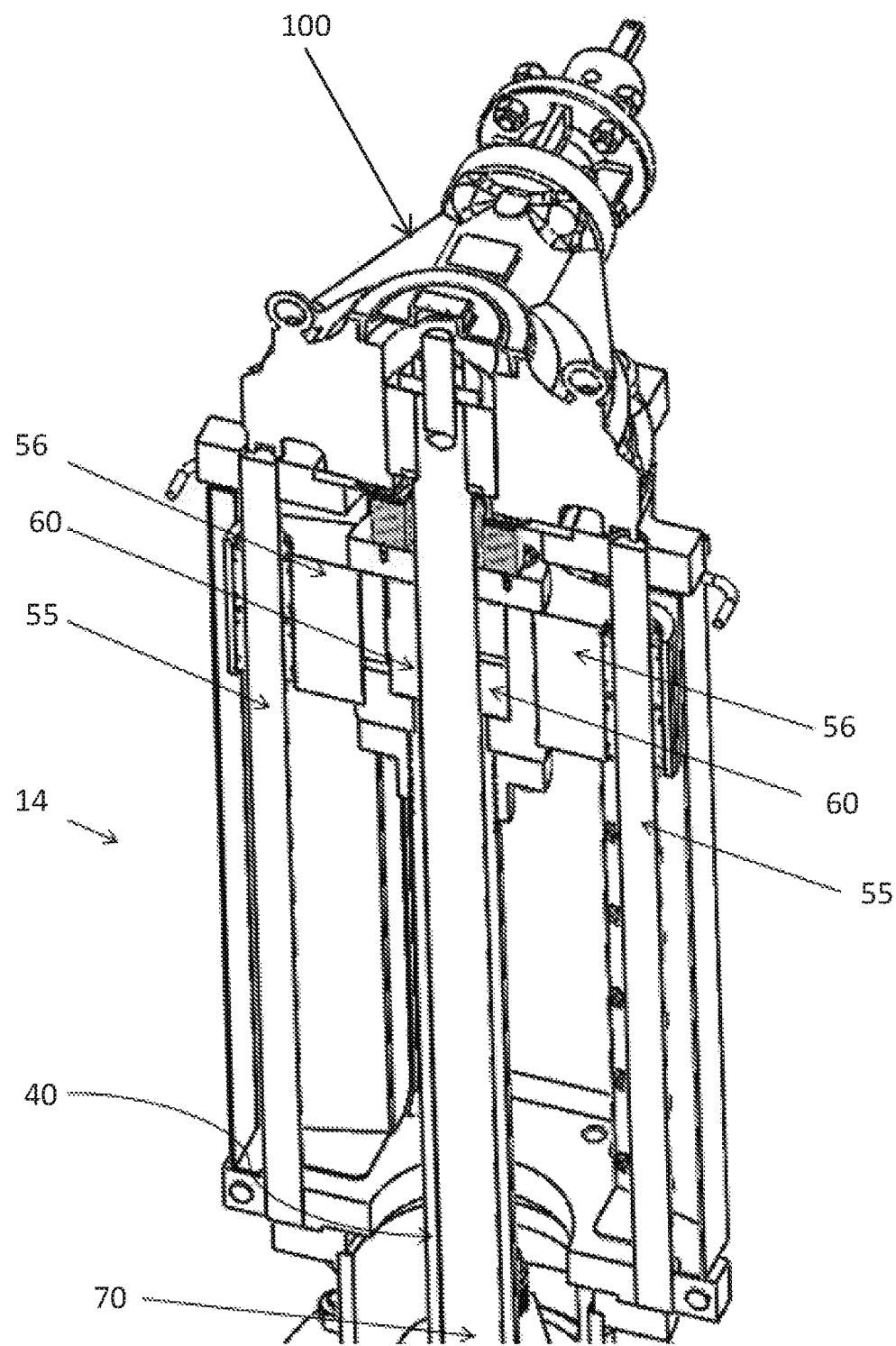
FIG. 6 shows an alternative cross-sectional view of an embodiment of the actuator housing.
Figure 7:
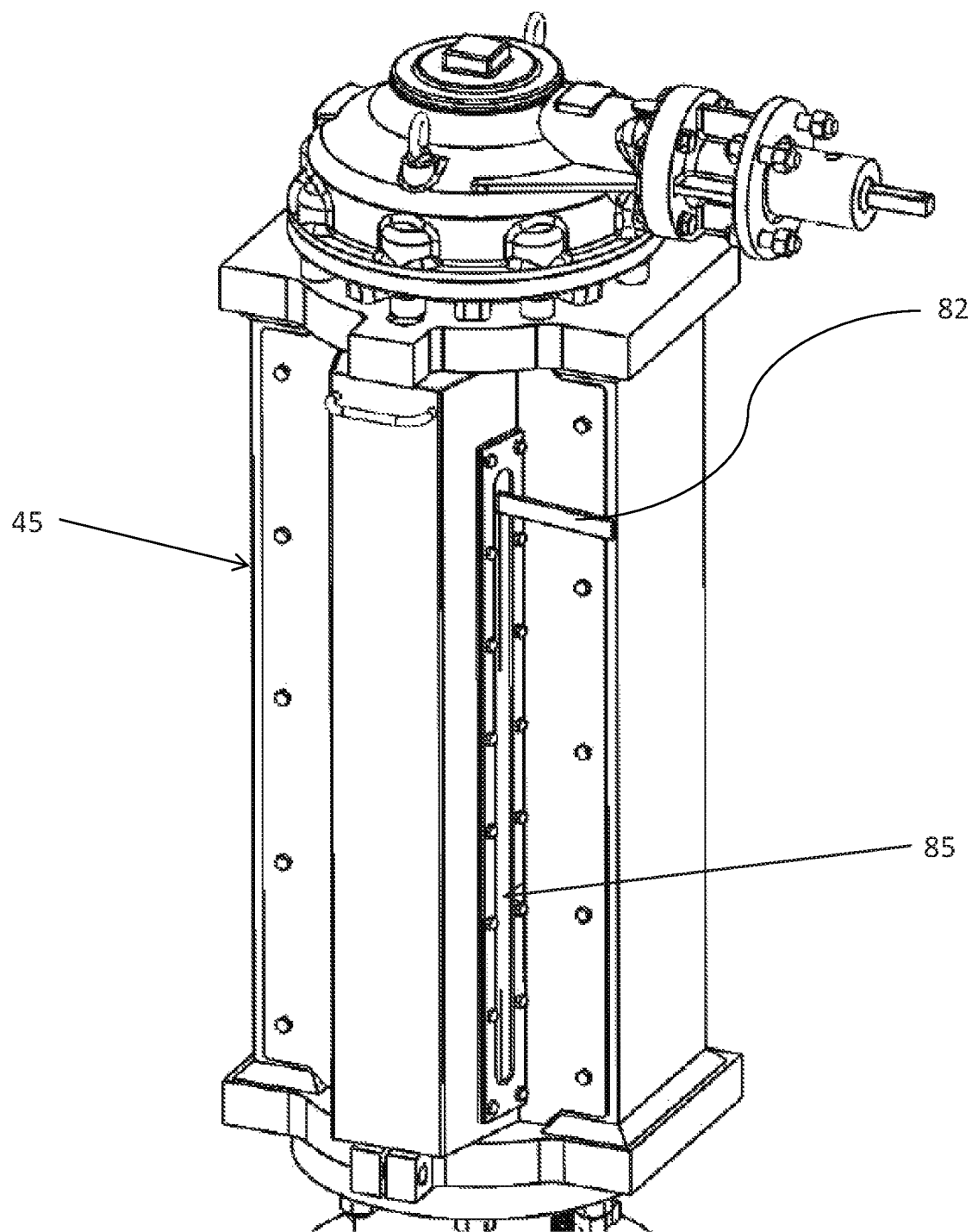
FIG. 7 illustrates a perspective view of an embodiment of the actuator housing.
Figure 8A:
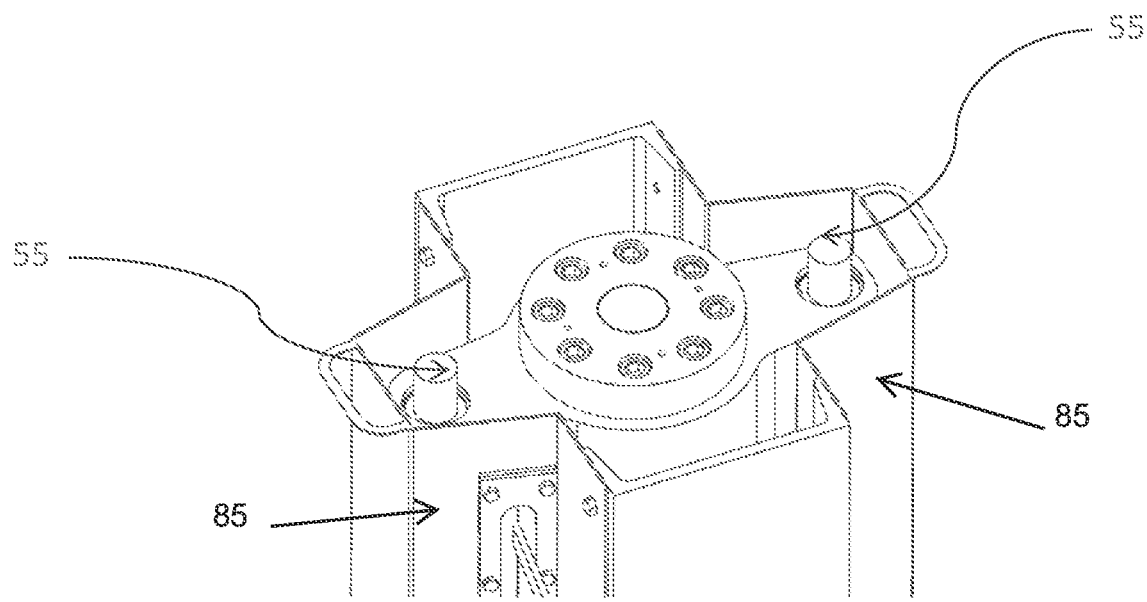
FIG. 8A illustrates perspective view of the anti-rotation rods in the nut housing.
Figure 8B:
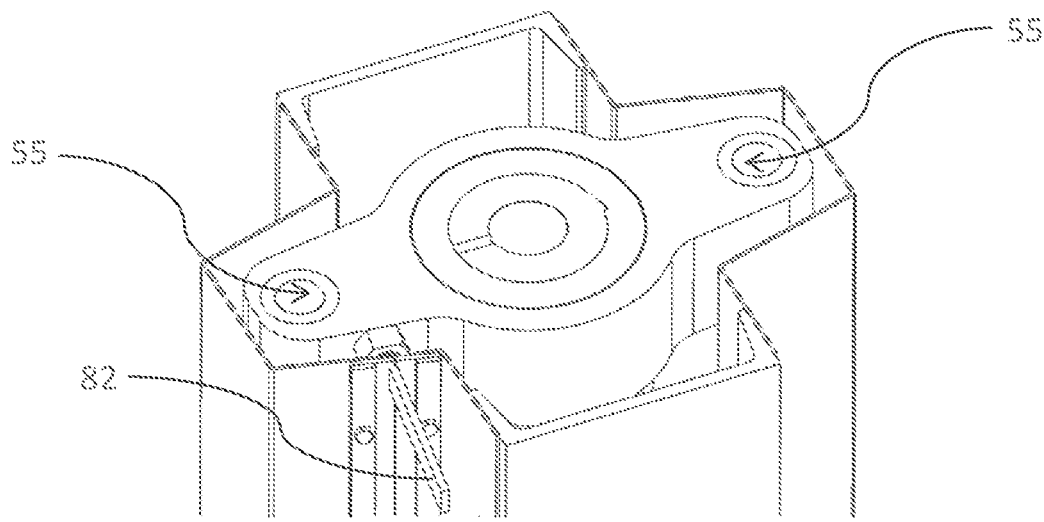
FIG. 8B illustrates an alternative perspective view of the anti-rotation rods in the nut housing.

FIG. 2 illustrates a non-limiting example of a de-heading system 10. Coke drum de-heading system 10 comprises a de-header valve 14 that removably couples to a coke drum 18 using various means known in the art. De-header valve 14 typically couples to coke drum 18 or a spool at its flanged port or opening, much the same way a flanged head unit would be attached in prior related designs. De-header valve 14 is shown further attaching to upper and lower bonnets 30 and 34, respectively.

The seat system of the de-header valve is designed to cleanly break the bond between the coke and the exposed surface of the valve closure at each stroke. The total thrust required for this action combined with the thrust required to overcome seating friction and inertia is carefully calculated and is accomplished by actuating the valve closure, thus causing it to relocate or transition from a closed to an open position.

FIG. 2 illustrates a non-limiting example of a sliding blind gate-type de-header valve 14, according to one exemplary embodiment of the disclosed invention. Sliding blind gate-type de-header valve 14 comprises a main body 15 removably coupled to upper and lower bonnets 30 and 34, each comprising upper and lower chambers 16 and 17, respectively. Main body 15 comprises an opening or port 20 therein. Main body 15 removably couples to a complimentary flange portion and associated opening or port of a coke drum 18 or a spool, such that each opening is concentric and aligned with one another.

Sliding blind gate-type de-header valve 14 further comprises a valve closure in the form of a sliding blind or gate 11. Some embodiments of a gate 11 may have an aperture therein that is capable of aligning with the opening in the coke drum and/or the opening in the spool, as well as the opening in the main body of the valve 20. Alternatively, some gates may be solid, not utilizing an aperture therein, but rather utilizing a short gate that effectively opens the valve to allow coke from a coke drum 18 to fall through a valve when the shortened gate 11 is retracted into the upper bonnet 30.

The gate 11 slides back and forth in a linear, bi-directional manner between means for supporting a valve closure, shown in this exemplary embodiment as seat support system 23. Seat support system 23 may comprise any type of seating arrangement, including dual, independent seats, wherein the seats are both static, both floating or dynamic, or a combination of these. Seat support system 23 may alternatively comprise a single seat in support of valve closure 11, wherein the seat may comprise a static or floating or dynamic seat. In another exemplary embodiment, means for supporting a valve closure may dispense with a seating system in favor of a support system built into main body 15, such that one or more portions or components of main body 15 are selected and prepared to support valve closure 11. In any event, seat support system may comprise a metal contact surface that contacts and seals with a metal surface on valve closure 11, wherein this contact seal is maintained during the coke manufacturing process.

Valve closure 11 is coupled to clevis 38, which is turn coupled to valve stem 40. Valve stem 40 may be utilized as an element of a system that functions to cause valve closure 11 to oscillate between an open and closed position. An actuator system 36 may be a hydraulically controlled power source contained within cylinder and that is capable of moving valve closure 11 through its linear, bi-directional cycle during a coking process, and may be utilized to de-head and re-head the coke drum 18. Alternatively, an actuator system 36 may be an electrically controlled power source utilizing an electric actuator that is capable of moving a valve closure via a transmission system 44 through its linear, bi-directional cycle during a coking process, and may be utilized to dehead and rehead the coke drum.

Often space in a valve is limited, yet the force necessary to open a close a gate valve requires large structural members to sustain the operational forces and avoid expensive and dangerous failure during operation. Non-rising stems are generally recognized for their compact form. Similarly, planetary roller screws are a mechanical actuator that uses rollers to transfer the load between nut and screw. The rollers are typically threaded but may also be grooved depending on roller screw type. Providing more bearing points than ball screws within a given volume, roller screws can be more compact for a given load capacity while providing similar efficiency at low to moderate speeds, and maintain relatively high efficiency at high speeds. Roller screws provide precise positioning precision, load rating, rigidity, speed, acceleration, and lifetime. Standard roller screw actuators can achieve dynamic load ratings above 130 tons of force (exceeded in single-unit actuator capacity only by hydraulic cylinders). However, system alignment is critical in a planetary roller screw, and when loads are excessive the torque created by actuation of a roller screw can damage either the planetary roller screw or system members being actuated. For this reason an improved apparatus and method of isolating the torque moment created by the planetary roller screw.

Detailed references will now be made to the preferred embodiments of the disclosed invention, examples of which are illustrated in FIGS. 3-7 illustrate various views of a torque isolating valve actuator in accordance with one or more embodiments of the invention. In some embodiments coke drum deheading system 10 is disclosed wherein a valve 14 comprising an actuator housing 65, an upper bonnet 30 and lower bonnet 34. In some embodiments the actuator housing 65 may be a hollow housing configured to house other components. In some embodiments the actuator housing 65 may enclose interior components. In some embodiments the actuator housing 65 may partially enclose internal components. In some embodiments the actuator housing 65 may comprise an internal lubricant pooled in the actuator housing 65 and circulated around internal components to reduce friction caused by movement of internal components. In some embodiments the actuator housing 65 may be rigid and configured to provide structural support to internal components, as well as brace against a torque moment created during actuation by the operation of internal components. In some embodiments the internal components housed in the actuator housing 65 are internally lubricated, and the actuator housing 65 may have access ports which are not sealed. In some embodiments the actuator housing 65 may a power port 90 to power the actuator mechanism which may be powered pneumatically, electrically or mechanically.

In some embodiments the actuator housing 65 houses a nut housing 45 disposed within the actuator housing. In some embodiments the nut housing comprises an actuator end proximal an actuator 100 and a stem end, on the opposite end of the nut housing 45, disposed adjacent the stem 40. In some embodiments the actuator comprises an actuator motor (not shown) disposed on the actuator end of the nut housing 45. In some embodiments the actuator motor is pneumatically powered. In some embodiments the actuator motor is electrically powered. In some embodiments the actuator 100 is manually driven. In some embodiments the actuator housing 65 comprises a channel 85 through which an indicator 82 indicates the position of the nut housing. In so embodiments the indicator channel 85 indicates the position of the gate in its stroke. In some embodiments the indicator channel 85 will indicate to an operator whether the gate is open, partially open or closed. In some embodiments the actuator is configured to move the stem 40 bi-directionally through the valve 14 to cause a gate or blind 11 to move to an open or a closed direction.

In some embodiments the nut housing 45 further comprises guide channels 60. In some embodiments the guide channels are anti-rotation rods 55 fixed to the actuator housing 65 by rod head 75 bolted to the actuator housing. In some embodiments the guide channels 60 are positioned on the outside of the nut housing and configured to pass a track, such as anti-rotation rods 55, there through 105. In some embodiments the guide channels 60 comprise pillow block bearings mounted to the outside of the nut housing 45 and wherein mounted anti-rotation rods 55 are in a plane parallel to the mounting surface, and perpendicular to the center line of the guide channel mounting holes and are configured to stabilize the alignment of the nut housing 45 with the actuator housing 65 during actuation. In some embodiments the anti-rotation rods 55 are smooth. In some embodiments anti-rotation rods 55 comprise grooves, such as a track which may mesh with a gear on the housing. Stabilizing the alignment of the nut housing with the actuator housing 65 shields the stem end of the nut housing 45 from the torque moment created during actuation.

In some embodiments the guide channels 60 comprise a single receiving member formed in the exterior of the nut housing 45 which is configured to receive a track, such as a flange extending from the interior wall of the actuator housing 65. In some embodiments the receiving member extends the entire length of the nut housing 45. In some embodiments the receiving member comprises one or more structural recesses aligned along the housing. In some embodiments the guide channels are self-lubricating while in other embodiments lubrication is contained within the actuator housing. In some embodiments the guide channels 60 are configured to fix the relative positions of the nut housing 45 and the actuator housing 65 so that the stem end of the nut housing 45 moves in a nearly exact straight line no matter the torque forces exerted on the nut housing 45 or the actuator housing 65. In this way the guide channels and the anti-rotation rods shield the stem end of the nut housing 45 from coming out of alignment due to torque forces created during actuation.

In some embodiments the nut housing 45 comprises rollers 50 within the nut housing configured to engage the threads on a screw shaft 70 which is positioned in the center of the rollers 50. In some embodiments there are several mechanically synchronized rollers 50 positioned within the nut housing 45, configured to engage a screw shaft 70. In some embodiments a power source, such as a motor, powers the synchronized rotation of the rollers 50. In some embodiments the alignment of the nut housing 45 is fixed in relation to the actuator housing 65 via a track such as anti-rotation rods 70, so as to prevent misalignment between the nut housing 45 and the actuator housing 65. In some embodiments the screw shaft 70 is fixed to the actuator housing 65 so as to prevent the screw shaft from rotating. In some embodiments the rollers 50 are driven and configured to rotate, and actuate the nut housing 45 to move bi-directionally along the anti-rotation rods 55 to reposition the nut housing 45 along the length of the screw shaft 70.

In some embodiments the nut housing 45 further comprises a keyway 95 to fix the orientation of the nut housing 45 with the orientation of the screw shaft 70. In some embodiments the nut housing 45 integration with the anti-rotation rods 55 isolates the screw shaft 70 from the torque force created by the roller 50 rotation, and thus prevents the torque moment from being exerted on screw shaft 70, or stem end of the nut housing 45. In some embodiments the nut housing 45 comprises a channel through which the screw shaft 70 passes as the nut housing 45 actuates. In some embodiments the stem end of the nut housing 45 is coupled to a stem 40. In some embodiments the actuator housing 65 comprises a non-rising stem configured to shield the stem 40 from the torque forces created by the actuation of the rollers.

In some embodiments the rollers 50 are fixed and engaged with the screw shaft 70 rotates and to actuate the nut housing 45 bi-directionally. In some embodiments the motor which rotates the screw shaft 70 is integrated into the actuator housing 65. In some embodiments the motor which drives the screw shaft 70 is selectively coupled to the actuator housing 65. In some embodiments the screw shaft 70 is aligned axially through the rollers 50 in the nut housing 45 wherein the nut housing 45 is configured to move bi-directionally along the screw shaft.

In some embodiments the anti-rotation rods 55 are disposed within the actuator housing 65 and connected to the actuator housing 65 and positioned outside the nut housing 45 and passing through the guide channels 60 wherein the guide channels 60 and anti-rotation rods 55 are configured to prevent the nut housing 45 from rotating as the rollers 50 rotate.

In some embodiments a stem 40 is coupled to the stem end of the nut housing 45. In some embodiments to conserve space the valve utilizes a non-rising stem 40. In some embodiments the non-rising stem 40 further conserves space by being configured with a receiving portion in the center of the stem, such that the stem 40 is hollow, and the screw shaft 70 passes telescopically through the receiving portion of the non-rising hollow stem 40 to receive and pass the screw shaft 70 at certain positions during the gate stroke. However, a hollow stem 40 may not have the same structural strength as a solid stem or a larger stem, and thus anti-rotational rods 55 are necessary to shield the hollow non-rising stem from damage caused by torque. In some embodiments the anti-rotation rods 55 provide the additional structural strength necessary to use a non-rising hollow stem 40 which may lack the structural strength to withstand the torque moment exerted by the nut housing 45 when actuated.

In some embodiments the anti-rotation rods 55 shield the threaded screw 70 and rollers 50 from the torsional forces created during actuation. In some embodiments the screw 70 is hollow to receive the telescoping lower portion of the stem. In some embodiments the threaded stem 70 is coupled to a hollow portion of the stem. In some embodiments a hollow section may be more prone to fail if a torsional force is exerted thereon. In some embodiments the anti-rotation rods keep the actuator parts, including the rollers 55 and threaded screw 70 and any hollow sections centered, thus shielding the rollers 55, threaded screw 70, stem and any hollow parts from torsional force, but also avoiding undue wear as the stem extends and telescopes. In some embodiments the anti-rotation rods 55 also maintain the alignment of the rollers 50 with the threads on the screw shaft 70 to both ensure optimal performance as well as mechanical longevity. In addition, the rods 55 guide the actuator parts through the stroke as the roller screws 55 progress down the screw 70 and then return up the screw 70.

In some embodiments the nut housing 45 further comprising an actuator disposed on the actuator end of the nut housing. In some embodiments. In some embodiments the actuator 45 is disposed on the actuator housing where the screw shaft couples to the actuator housing. In some embodiments the guide channels 60 comprise pillow blocks. In some embodiments the nut housing 45 moves bi-directionally along the length of the screw shaft 70. In some embodiments the actuator coupled to the rotating screw is configured to rotate the screw to actuate the stem.

In closing, it is to be understood that the embodiments of the disclosure disclosed herein are illustrative of the principles of the present disclosure. Other modifications that may be employed are within the scope of the disclosure. Thus, by way of example, but not of limitation, alternative configurations of the present disclosure may be utilized in accordance with the teachings herein. Accordingly, the present disclosure is not limited to that precisely as shown and described.

The invention claimed is:

1. A torque isolating valve actuator comprising:
an actuator housing comprising a first housing channel and a second housing channel;
a nut housing partially disposed within the first housing channel and the second housing channel wherein the nut housing slides along the housing channel and the nut housing comprises an actuator end and a stem end, and a plurality of guide channels formed in the nut housing which extended parallel the axis of the housing;
rollers within the nut housing;
a screw shaft aligned axially through the rollers in the nut housing wherein the nut housing is configured to move along the screw shaft;
a first rod recessed in the first housing channel configured to receive the distal portion of the nut housing and a second rod recessed within the second housing channel configured to receive the distal portion of the nut housing and connected to the actuator housing and positioned outside the nut housing and passing through the guide channels wherein the first housing channel, the second housing channel, the guide channels and rods are configured to prevent the nut housing from rotating as the actuator actuates; and
a non-rising hollow stem axially coupled to the stem end of the nut housing configured to pass the screw shaft as the nut housing moves along the screw shaft and wherein the nut housing and rods are configured to shield the non-rising hollow stem from the transfer of a torque force caused by the rotation of the planetary roller screw.

2. The torque isolating valve actuator of claim 1 wherein the rods are disposed parallel to the non-rising hollow stem and configured to align the hollow stem with a telescoping valve stem.

3. The torque isolating valve actuator of claim 1 wherein the rods are disposed so as to align the rollers with the screw shaft.

4. The torque isolating valve actuator of claim 1 wherein the guide channels comprise pillow blocks.

5. The torque isolating valve actuator of claim 1 wherein the actuator housing channel comprises an indicator indicates the position of the nut housing.

6. The torque isolating valve actuator of claim 1 wherein the nut housing moves bi-directionally along the length of the screw.

7. The torque isolating valve actuator of claim 1 wherein the actuator housing further comprises a motor coupled to the planetary roller screw configured to rotate the planetary roller screw to actuate the screw stem.

8. The torque isolating valve actuator of claim 1 wherein wherein the internal rollers rotate to move the nut housing.

9. The torque isolating valve actuator of claim 1 further comprising a housing keyway which fixes the orientation of the screw shaft with respect to the nut housing.

10. The torque isolating valve actuator of claim 1 wherein the screw shaft rotates to move the nut housing.

11. A non-rising stem actuator valve comprising:
an actuator housing comprising a plurality of anti-rotation rods disposed within housing channels formed within the housing;
a screw shaft fixed on a first end of the actuator housing and extending axially along the interior of the housing and parallel the plurality of anti-rotation rods;
a nut housing configured to nest within the housing channels the nut housing comprising a planetary roller screw disposed within the actuator housing comprising a stem end and an actuator on an actuator-end of the housing, wherein the planetary roller screw engages the screw shaft;
a stem extending from the stem end of the nut housing wherein the stem is hollow and configured to pass the screw shaft through the hollow stem;
an upper bonnet connected to the actuator housing and configured to contain a steam at pressure and through which the stem passes;
a gate having an aperture therein connected to the stem;
a valve opening having a first flange and a second flange wherein the gate crosses the opening when the gate aperture aligns with the opening; and
a lower bonnet configured to hold steam pressure wherein the gate aperture is placed when the valve is closed.

12. The non-rising stem actuator valve of claim 11 wherein the nut housing further comprises an actuator disposed on the actuator end of the nut housing.

13. The non-rising stem actuator valve of claim 11 wherein the actuator is disposed on the actuator housing where the screw shaft couples to the actuator housing.

14. The non-rising stem actuator valve of claim 11 wherein the guide channels comprise pillow blocks.

15. The non-rising stem actuator valve of claim 11 wherein the actuator housing channel comprises an indicator which indicates the position of the nut housing.

16. The non-rising stem actuator valve of claim 11 wherein the wherein the nut housing moves bi-directionally along the length of the screw.

17. The non-rising stem actuator valve of claim 11 wherein the actuator housing further comprises an actuator member coupled to the rotating screw configured to rotate the screw to actuate the stem.

18. The non-rising stem actuator valve of claim 11 wherein the rods are smooth.

19. The non-rising stem actuator valve of claim 11 wherein the nut housing further comprises a housing keyway which fixes the orientation of the screw shaft with respect to the nut housing.

20. The non-rising stem actuator valve of claim 11 wherein the screw shaft rotates to move the nut housing.

* * * * *